US012731342B2

(12) United States Patent
Zohar et al.

(10) Patent No.: US 12,731,342 B2
(45) Date of Patent: Sep. 8, 2026

(54) FOOTWEAR MIRROR EXPERIENCE

(71) Applicant: Snap Inc., Santa Monica, CA (US)

(72) Inventors: Matan Zohar, Rishon LeZion (IL); Itamar Berger, Hod Hasharon (IL); Gal Sasson, Kibbutz Ayyelet Hashahar (IL); Omri Berg, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 44 days.

(21) Appl. No.: 18/162,453

(22) Filed: Jan. 31, 2023

(65) Prior Publication Data

US 2024/0257473 A1 Aug. 1, 2024

(51) Int. Cl.
*G06T 19/00* (2011.01)
*G06F 3/01* (2006.01)

(52) U.S. Cl.
CPC ............ *G06T 19/006* (2013.01); *G06F 3/017* (2013.01)

(58) Field of Classification Search
CPC ........ G06T 19/006; G06F 3/017; G06F 3/011; G06Q 30/0643; G06V 20/20
USPC .......................................................... 345/419
See application file for complete search history.

(56) References Cited

U.S. PATENT DOCUMENTS 1,172,736 A * 2/1916 Rice ........................ G09F 19/10 223/66
5,604,843 A 2/1997 Shaw et al.
5,689,559 A 11/1997 Park
5,880,731 A 3/1999 Liles et al.
6,023,270 A 2/2000 Brush, II et al.
RE36,919 E 10/2000 Park
RE37,052 E 2/2001 Park
6,223,165 B1 4/2001 Lauffer
6,650,793 B1 11/2003 Lund et al.
6,772,195 B1 8/2004 Hatlelid et al.
6,804,417 B1 10/2004 Lund et al.
6,842,779 B1 1/2005 Nishizawa
6,975,232 B1 * 12/2005 McKenna .............. A43D 1/025 378/92

(Continued)

FOREIGN PATENT DOCUMENTS

BJ 2001230801 A 8/2001
CN 103049761 B 8/2016

(Continued)

OTHER PUBLICATIONS

P. Eisert, P. Fechteler and J. Rurainsky, "3-D Tracking of shoes for Virtual Mirror applications," 2008 IEEE Conference on Computer Vision and Pattern Recognition, Anchorage, AK, USA, 2008, pp. 1-6.*

(Continued)

*Primary Examiner* — Sheree N Brown
(74) *Attorney, Agent, or Firm* — Schwegman Lundberg & Woessner, P.A.

(57) ABSTRACT

Aspects of the present disclosure involve a system for providing a footwear mirror experience. The system accesses a video stream captured by a camera directed at feet of users. The system detects a depiction of one or more feet of a user in the video stream captured by the camera. The system, in response to detecting the one or more feet in the video stream captured by the camera, activates a display screen that is positioned at an eye-level of the user and presents the video stream including the depiction of the one or more feet of the user on the display screen.

20 Claims, 12 Drawing Sheets

(56) References Cited

U.S. PATENT DOCUMENTS 7,342,587 B2 3/2008 Danzig et al.
7,468,729 B1 12/2008 Levinson
7,636,755 B2 12/2009 Blattner et al.
7,639,251 B2 12/2009 Gu et al.
7,775,885 B2 8/2010 Van Luchene et al.
7,859,551 B2 12/2010 Bulman et al.
7,885,931 B2 2/2011 Seo et al.
7,925,703 B2 4/2011 Dinan et al.
7,971,156 B2 6/2011 Albertson et al.
7,996,793 B2 8/2011 Latta et al.
8,088,044 B2 1/2012 Tchao et al.
8,095,878 B2 1/2012 Bates et al.
8,108,774 B2 1/2012 Finn et al.
8,117,281 B2 2/2012 Robinson et al.
8,130,219 B2 3/2012 Fleury et al.
8,146,005 B2 3/2012 Jones et al.
8,151,191 B2 4/2012 Nicol
8,275,590 B2 * 9/2012 Szymczyk ............ G06Q 50/01 345/646
RE43,993 E 2/2013 Park
8,384,719 B2 2/2013 Reville et al.
RE44,054 E 3/2013 Kim
RE44,068 E 3/2013 Park
RE44,106 E 3/2013 Park
8,396,708 B2 3/2013 Park et al.
RE44,121 E 4/2013 Park
8,425,322 B2 4/2013 Gillo et al.
8,458,601 B2 6/2013 Castelli et al.
8,462,198 B2 6/2013 Lin et al.
8,484,158 B2 7/2013 Deluca et al.
8,487,938 B2 7/2013 Latta et al.
8,495,503 B2 7/2013 Brown et al.
8,495,505 B2 7/2013 Smith et al.
8,504,926 B2 8/2013 Wolf
8,559,980 B2 10/2013 Pujol
8,564,621 B2 10/2013 Branson et al.
8,564,710 B2 10/2013 Nonaka et al.
8,581,911 B2 11/2013 Becker et al.
8,597,121 B2 12/2013 del Valle
8,601,051 B2 12/2013 Wang
8,601,379 B2 12/2013 Marks et al.
8,632,408 B2 1/2014 Gillo et al.
8,648,865 B2 2/2014 Dawson et al.
8,659,548 B2 2/2014 Hildreth
8,683,354 B2 3/2014 Khandelwal et al.
8,692,830 B2 4/2014 Nelson et al.
8,810,513 B2 8/2014 Ptucha et al.
8,812,171 B2 8/2014 Filev et al.
8,832,201 B2 9/2014 Wall
8,832,552 B2 9/2014 Arrasvuori et al.
8,839,327 B2 9/2014 Amento et al.
8,856,691 B2 10/2014 Geisner et al.
8,890,926 B2 11/2014 Tandon et al.
8,892,999 B2 11/2014 Nims et al.
8,924,250 B2 12/2014 Bates et al.
8,963,926 B2 2/2015 Brown et al.
8,989,786 B2 3/2015 Feghali
9,086,776 B2 7/2015 Ye et al.
9,105,014 B2 8/2015 Collet et al.
9,225,897 B1 12/2015 Sehn et al.
9,230,160 B1 1/2016 Kanter
9,241,184 B2 1/2016 Weerasinghe
9,256,860 B2 2/2016 Herger et al.
9,276,886 B1 3/2016 Samaranayake
9,298,257 B2 3/2016 Hwang et al.
9,314,692 B2 4/2016 Konoplev et al.
9,330,483 B2 5/2016 Du et al.
9,357,174 B2 5/2016 Li et al.
9,361,510 B2 6/2016 Yao et al.
9,378,576 B2 6/2016 Bouaziz et al.
9,402,057 B2 7/2016 Kaytaz et al.
9,412,192 B2 8/2016 Mandel et al.
9,460,541 B2 10/2016 Li et al.
9,489,760 B2 11/2016 Li et al.
9,503,845 B2 11/2016 Vincent
9,508,197 B2 11/2016 Quinn et al.
9,532,364 B2 12/2016 Fujito
9,544,257 B2 1/2017 Ogundokun et al.
9,576,400 B2 2/2017 Van Os et al.
9,589,357 B2 3/2017 Li et al.
9,592,449 B2 3/2017 Barbalet et al.
9,648,376 B2 5/2017 Chang et al.
9,697,635 B2 7/2017 Quinn et al.
9,705,831 B2 7/2017 Spiegel
9,706,040 B2 7/2017 Kadirvel et al.
9,742,713 B2 8/2017 Spiegel et al.
9,744,466 B2 8/2017 Fujioka
9,746,990 B2 8/2017 Anderson et al.
9,749,270 B2 8/2017 Collet et al.
9,792,714 B2 10/2017 Li et al.
9,839,844 B2 12/2017 Dunstan et al.
9,883,838 B2 2/2018 Kaleal, III et al.
9,898,849 B2 2/2018 Du et al.
9,911,073 B1 3/2018 Spiegel et al.
9,936,165 B2 4/2018 Li et al.
9,959,037 B2 5/2018 Chaudhri et al.
9,980,100 B1 5/2018 Charlton et al.
9,990,373 B2 6/2018 Fortkort
10,039,988 B2 8/2018 Lobb et al.
10,097,492 B2 10/2018 Tsuda et al.
10,102,423 B2 10/2018 Shaburov et al.
10,116,598 B2 10/2018 Tucker et al.
10,155,168 B2 12/2018 Blackstock et al.
10,158,589 B2 12/2018 Collet et al.
10,242,477 B1 3/2019 Charlton et al.
10,242,503 B2 3/2019 McPhee et al.
10,262,250 B1 4/2019 Spiegel et al.
10,284,508 B1 5/2019 Allen et al.
10,348,662 B2 7/2019 Baldwin et al.
10,362,219 B2 7/2019 Wilson et al.
10,432,559 B2 10/2019 Baldwin et al.
10,439,972 B1 10/2019 Spiegel et al.
10,454,857 B1 10/2019 Blackstock et al.
10,475,225 B2 11/2019 Park et al.
10,504,266 B2 12/2019 Blattner et al.
10,509,466 B1 12/2019 Miller et al.
10,514,876 B2 12/2019 Sehn
10,573,048 B2 2/2020 Ni et al.
10,579,869 B1 3/2020 Xiong et al.
10,614,855 B2 4/2020 Huang
10,656,797 B1 5/2020 Alvi et al.
10,657,695 B2 5/2020 Chand et al.
10,657,701 B2 5/2020 Osman et al.
10,748,347 B1 8/2020 Li et al.
10,762,174 B2 9/2020 Denton et al.
10,805,248 B2 10/2020 Luo et al.
10,872,451 B2 12/2020 Sheth et al.
10,880,246 B2 12/2020 Baldwin et al.
10,895,964 B1 1/2021 Grantham et al.
10,896,534 B1 1/2021 Smith et al.
10,933,311 B2 3/2021 Brody et al.
10,938,758 B2 3/2021 Allen et al.
10,958,608 B1 3/2021 Allen et al.
10,962,809 B1 3/2021 Castañeda
10,964,082 B2 3/2021 Amitay et al.
10,979,752 B1 4/2021 Brody et al.
10,984,575 B2 4/2021 Assouline et al.
10,992,619 B2 4/2021 Antmen et al.
10,996,846 B2 5/2021 Robertson et al.
10,997,787 B2 5/2021 Ge et al.
11,010,022 B2 5/2021 Alvi et al.
11,012,390 B1 5/2021 Al Majid et al.
11,030,454 B1 6/2021 Xiong et al.
11,030,789 B2 6/2021 Chand et al.
11,036,368 B1 6/2021 Al Majid et al.
11,036,781 B1 6/2021 Baril et al.
11,062,498 B1 7/2021 Voss et al.
11,063,891 B2 7/2021 Voss
11,069,103 B1 7/2021 Blackstock et al.
11,080,917 B2 8/2021 Monroy-HernÁNdez et al.
11,087,728 B1 8/2021 Canberk et al.
11,092,998 B1 8/2021 Castañeda et al.
11,106,342 B1 8/2021 Al Majid et al.
11,126,206 B2 9/2021 Meisenholder et al.

(56) References Cited

U.S. PATENT DOCUMENTS 11,128,586 B2 9/2021 Al Majid et al.
11,143,867 B2 10/2021 Rodriguez, II
11,169,600 B1 11/2021 Canberk et al.
11,188,190 B2 11/2021 Blackstock et al.
11,189,070 B2 11/2021 Jahangiri et al.
11,199,957 B1 12/2021 Alvi et al.
11,218,433 B2 1/2022 Baldwin et al.
11,227,626 B1 1/2022 Krishnan Gorumkonda et al.
11,229,849 B2 1/2022 Blackstock et al.
11,245,658 B2 2/2022 Grantham et al.
11,249,614 B2 2/2022 Brody
11,263,254 B2 3/2022 Baril et al.
11,270,491 B2 3/2022 Monroy-Hernández et al.
11,284,144 B2 3/2022 Kotsopoulos et al.
11,307,747 B2 4/2022 Dancie et al.
11,531,402 B1 12/2022 Stolzenberg
11,546,505 B2 1/2023 Canberk
11,978,174 B1 * 5/2024 Li .......................... G06N 3/08
12,100,114 B1 * 9/2024 Karumuri ................. G06T 7/70
12,136,180 B1 * 11/2024 Karumuri ................. G06T 7/73
12,211,076 B2 * 1/2025 Bleicher ............ G06Q 30/0621
2002/0067362 A1 6/2002 Agostino Nocera et al.
2002/0169644 A1 11/2002 Greene
2005/0162419 A1 7/2005 Kim et al.
2005/0206610 A1 9/2005 Cordelli
2005/0273820 A1 * 12/2005 Elberbaum .......... H04N 21/858 705/26.1
2006/0007191 A1 1/2006 Chi et al.
2006/0098112 A1 * 5/2006 Kelly .................... H04N 23/64 348/333.12
2006/0294465 A1 12/2006 Ronen et al.
2007/0113181 A1 5/2007 Blattner et al.
2007/0168863 A1 7/2007 Blattner et al.
2007/0176921 A1 8/2007 Iwasaki et al.
2008/0158222 A1 7/2008 Li et al.
2009/0012788 A1 1/2009 Gilbert et al.
2009/0016617 A1 1/2009 Bregman-amitai et al.
2009/0055484 A1 2/2009 Vuong et al.
2009/0070688 A1 3/2009 Gyorfi et al.
2009/0099925 A1 4/2009 Mehta et al.
2009/0106672 A1 4/2009 Burstrom
2009/0158170 A1 6/2009 Narayanan et al.
2009/0177976 A1 7/2009 Bokor et al.
2009/0202114 A1 8/2009 Morin et al.
2009/0265604 A1 10/2009 Howard et al.
2009/0300525 A1 12/2009 Jolliff et al.
2009/0303984 A1 12/2009 Clark et al.
2010/0011422 A1 1/2010 Mason et al.
2010/0023885 A1 1/2010 Reville et al.
2010/0115426 A1 5/2010 Liu et al.
2010/0162149 A1 6/2010 Sheleheda et al.
2010/0203968 A1 8/2010 Gill et al.
2010/0227682 A1 9/2010 Reville et al.
2011/0093780 A1 4/2011 Dunn
2011/0107263 A1 * 5/2011 Ivanov ................ G06Q 10/087 715/838
2011/0115798 A1 5/2011 Nayar et al.
2011/0148864 A1 6/2011 Lee et al.
2011/0199393 A1 * 8/2011 Nurse .................... G06F 3/017 345/665
2011/0239136 A1 9/2011 Goldman et al.
2011/0301934 A1 12/2011 Tardif
2012/0113106 A1 5/2012 Choi et al.
2012/0124458 A1 5/2012 Cruzada
2012/0130717 A1 5/2012 Xu et al.
2013/0103760 A1 4/2013 Golding et al.
2013/0182005 A1 * 7/2013 Fretwell ............... G06F 3/0488 345/629
2013/0201187 A1 8/2013 Tong et al.
2013/0229482 A1 9/2013 Vilcovsky et al.
2013/0249948 A1 9/2013 Reitan
2013/0257877 A1 10/2013 Davis
2013/0307851 A1 * 11/2013 Hernandez ............. G06T 17/00 345/420
2014/0043329 A1 2/2014 Wang et al.
2014/0055554 A1 2/2014 Du et al.
2014/0125678 A1 5/2014 Wang et al.
2014/0129343 A1 5/2014 Finster et al.
2014/0171036 A1 6/2014 Simmons
2015/0070270 A1 * 3/2015 Bailey ................. A61B 5/1123 345/156
2015/0120293 A1 4/2015 Wohlert et al.
2015/0206349 A1 7/2015 Rosenthal et al.
2015/0370320 A1 12/2015 Connor
2016/0134840 A1 5/2016 Mcculloch
2016/0234149 A1 8/2016 Tsuda et al.
2016/0253746 A1 * 9/2016 Morrison ........... G06Q 30/0625 705/26.62
2017/0080346 A1 3/2017 Abbas
2017/0087473 A1 3/2017 Siegel et al.
2017/0113140 A1 4/2017 Blackstock et al.
2017/0118145 A1 4/2017 Aittoniemi et al.
2017/0123487 A1 5/2017 Hazra et al.
2017/0132842 A1 * 5/2017 Morrison ............ G06F 3/04815
2017/0199855 A1 7/2017 Fishbeck
2017/0235848 A1 8/2017 Van Dusen et al.
2017/0277684 A1 9/2017 Dharmarajan Mary
2017/0277685 A1 9/2017 Takumi
2017/0310934 A1 10/2017 Du et al.
2017/0312634 A1 11/2017 Ledoux et al.
2017/0351910 A1 12/2017 Elwazer et al.
2018/0047200 A1 2/2018 O'hara et al.
2018/0113587 A1 4/2018 Allen et al.
2018/0115503 A1 4/2018 Baldwin et al.
2018/0158370 A1 6/2018 Pryor
2018/0160776 A1 * 6/2018 Hei ........................ A43D 1/025
2018/0198743 A1 7/2018 Blackstock et al.
2018/0315076 A1 11/2018 Andreou
2018/0315133 A1 11/2018 Brody et al.
2018/0315134 A1 11/2018 Amitay et al.
2019/0001223 A1 1/2019 Blackstock et al.
2019/0057616 A1 2/2019 Cohen et al.
2019/0097958 A1 3/2019 Collet et al.
2019/0188920 A1 6/2019 Mcphee et al.
2019/0220661 A1 * 7/2019 Wang ....................... G02B 5/08
2019/0272675 A1 * 9/2019 Wagner ................. H04N 23/57
2019/0280997 A1 9/2019 Baldwin et al.
2019/0302901 A1 * 10/2019 Tian ........................ G06F 3/017
2020/0033951 A1 1/2020 Horowitz et al.
2020/0065991 A1 2/2020 Chu et al.
2020/0226668 A1 * 7/2020 Chiu ..................... G06Q 10/40
2020/0306637 A1 10/2020 Baldwin et al.
2020/0372127 A1 11/2020 Denton et al.
2020/0410575 A1 12/2020 Grantham et al.
2021/0011612 A1 1/2021 Dancie et al.
2021/0074016 A1 3/2021 Li et al.
2021/0074047 A1 3/2021 Sheth et al.
2021/0089179 A1 3/2021 Grantham et al.
2021/0104087 A1 4/2021 Smith et al.
2021/0166732 A1 6/2021 Shaburova et al.
2021/0168108 A1 6/2021 Antmen et al.
2021/0170270 A1 6/2021 Brody et al.
2021/0174034 A1 6/2021 Retek et al.
2021/0192823 A1 6/2021 Amitay et al.
2021/0209825 A1 7/2021 Assouline et al.
2021/0225058 A1 7/2021 Chand et al.
2021/0240315 A1 8/2021 Alvi et al.
2021/0241529 A1 8/2021 Cowburn et al.
2021/0243482 A1 8/2021 Baril et al.
2021/0243503 A1 8/2021 Kotsopoulos et al.
2021/0266277 A1 8/2021 Allen et al.
2021/0275098 A1 * 9/2021 Tian ........................ G06F 3/011
2021/0281897 A1 9/2021 Brody et al.
2021/0285774 A1 9/2021 Collins et al.
2021/0303075 A1 9/2021 Cowburn et al.
2021/0303077 A1 9/2021 Anvaripour et al.
2021/0303140 A1 9/2021 Mourkogiannis
2021/0306290 A1 9/2021 Voss
2021/0306451 A1 9/2021 Heikkinen et al.
2021/0382564 A1 12/2021 Blachly et al.
2021/0385180 A1 12/2021 Al Majid et al.
2021/0397000 A1 12/2021 Rodriguez, II
2021/0405761 A1 12/2021 Canberk

(56) References Cited

U.S. PATENT DOCUMENTS

| | | | | |
|---|---|---|---|---|
| 2021/0405831 | A1 | 12/2021 | Mourkogiannis et al. | |
| 2021/0409535 | A1 | 12/2021 | Mourkogiannis et al. | |
| 2022/0012929 | A1 | 1/2022 | Blackstock et al. | |
| 2022/0078503 | A1* | 3/2022 | Putnam | H04N 21/4316 |
| 2022/0101417 | A1* | 3/2022 | Boscolo | G06Q 30/0621 |
| 2022/0174242 | A1* | 6/2022 | Culver, II | H04N 7/183 |
| 2022/0188539 | A1 | 6/2022 | Chan et al. | |
| 2022/0197405 | A1* | 6/2022 | Tian | G06F 1/1694 |
| 2022/0206588 | A1 | 6/2022 | Canberk et al. | |
| 2022/0300730 | A1 | 9/2022 | Eirinberg et al. | |
| 2022/0300731 | A1 | 9/2022 | Eirinberg et al. | |
| 2022/0301245 | A1 | 9/2022 | Shuvi | |
| 2022/0326781 | A1 | 10/2022 | Hwang et al. | |
| 2022/0334649 | A1 | 10/2022 | Hwang et al. | |
| 2024/0013463 | A1* | 1/2024 | Assouline | H04L 51/10 |
| 2024/0177388 | A1* | 5/2024 | Johl | G06N 3/006 |

FOREIGN PATENT DOCUMENTS

| | | | |
|---|---|---|---|
| CN | 109863532 | A | 6/2019 |
| CN | 110168478 | A | 8/2019 |
| EP | 2184092 | A2 | 5/2010 |
| EP | 3707693 | A1 | 9/2020 |
| EP | 4016434 | A1 | 6/2022 |
| JP | 5497931 | B2 | 3/2014 |
| KR | 101445263 | B1 | 9/2014 |
| KR | 20220158824 | A | 12/2022 |
| WO | WO-2003094072 | A1 | 11/2003 |
| WO | WO-2004095308 | A1 | 11/2004 |
| WO | WO-2006107182 | A1 | 10/2006 |
| WO | WO-2007134402 | A1 | 11/2007 |
| WO | WO-2012139276 | A1 | 10/2012 |
| WO | WO-2013027893 | A1 | 2/2013 |
| WO | WO-2013152454 | A1 | 10/2013 |
| WO | WO-2013166588 | A1 | 11/2013 |
| WO | WO-2014031899 | A1 | 2/2014 |
| WO | WO-2014194439 | A1 | 12/2014 |
| WO | WO-2016090605 | A1 | 6/2016 |
| WO | WO-2016168591 | A1 | 10/2016 |
| WO | WO-2018081013 | A1 | 5/2018 |
| WO | WO-2018102562 | A1 | 6/2018 |
| WO | WO-2018129531 | A1 | 7/2018 |
| WO | WO-2019089613 | A1 | 5/2019 |
| WO | WO-2019094618 | A1 | 5/2019 |
| WO | WO-2022005687 | A1 | 1/2022 |
| WO | WO-2022005693 | A1 | 1/2022 |
| WO | WO-2022060549 | A2 | 3/2022 |
| WO | WO-2022066578 | A1 | 3/2022 |
| WO | WO-2022132381 | A1 | 6/2022 |
| WO | WO-2022146678 | A1 | 7/2022 |
| WO | WO-2022198182 | A1 | 9/2022 |
| WO | WO-2022216784 | A1 | 10/2022 |
| WO | WO-2022225761 | A1 | 10/2022 |
| WO | WO-2022245765 | A1 | 11/2022 |
| WO | WO-2024163618 | A1 | 8/2024 |

OTHER PUBLICATIONS

P. Eisert, J. Rurainsky and P. Fechteler, "Virtual Mirror: Real-Time Tracking of Shoes in Augmented Reality Environments," 2007 IEEE International Conference on Image Processing, San Antonio, TX, USA, 2007, pp. II-557-II-560.*

Eisert, Titled: 3D Tracking of shoes for virtual Mirror applications; 2008, IEEE Conference on Computer Vision and Pattern Recognition. (Year: 2008).*

Eisert, Titled: 3D Tracking of shoes for virtual Mirror applications; 2008, IEEE Conference on Computer Vision and Pattern Recognition, 2008 (Year: 2008).*

3D Tracking of shoes for virtual Mirror applications; 2008, IEEE Conference on Computer Vision and Pattern Recognition, 2008 (Year: 2009).*

C. Redaelli, R. Pellegrini, S. Mottura and M. Sacco, "Shoe customers' behaviour with new technologies: the Magic Mirror case," 2009 IEEE International Technology Management Conference (ICE), Leiden, Netherlands, 2009, pp. 1-10. (Year: 2009).*

P. Eisert, P. Fechteler and J. Rurainsky, "3-D Tracking of shoes for Virtual Mirror applications," 2008 IEEE Conference on Computer Vision and Pattern Recognition, Anchorage, AK, USA, 2008, pp. 1-6. (Year: 2008).*

"Bitmoji", Snapchat Support, [Online] Retrieved from the Internet: <URL:https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL:https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL:https://web.archive.org/web/20150206000940/http://company.bitstrips.com/bitstrips-app.html>, (captured Feb. 6, 2015), 3 pgs.

"Manage Your Bitmoji", Snapchat Support, [Online] Retrieved from the Internet: <URL:https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL:https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL:https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL:https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL:https://techcrunch.com/2020/01/30/bitmoji-tv/>, (Jan. 30, 2020), 13 pgs.

Macmillan, Douglas, "Snapchat Buys Bitmoji App for More Than $100 Million", The Wallstreet Journal, [Online] Retrieved from the Internet: <URL:https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL:https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL:https://www.theverge.com/2018/1/30/16949402/bitmoji-deluxe-snapchat-customization>, (Jan. 30, 2018), 2 pgs.

Reign, Ashley, "How to Add My Friend's Bitmoji to My Snapchat", Women.com, [Online]Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet : <URL:https://www.ibtimes.com/snapchat-update-how-add-bitmoji-customizable-geofilters-2448152>, (Nov. 18, 2016), 6 pgs.

"International Application Serial No. PCT/US2024/013777, International Search Report mailed May 28, 2024", 5 pgs.

"International Application Serial No. PCT/US2024/013777, Written Opinion mailed May 28, 2024",9 pgs.

(56) References Cited

OTHER PUBLICATIONS

"Virtual Mirror", DigitalDM, [Online]. Retrieved from the Internet:<https://web.archive.org/web/20221210095107/https://digitaldm.com/virtual-mirror/>, (Dec. 10, 2022), 10 pgs.
Karkour, Mustafa, et al., "Mobile Application for Augmented Shopping: Virtual Shoe (Try-on and Virtual Equipment Placement", 8th International HCI and UX Conference in Indonesia (Chiuxid), IEEE, vol. 1, (Nov. 19, 2022), 59-64.
"Korean Application Serial No. 10-2025-7028801, Notice of Preliminary Rejection mailed Jul. 15, 2026", w/ English translation, 17 pgs.

* cited by examiner

FOOTWEAR MIRROR EXPERIENCE

TECHNICAL FIELD

The present disclosure relates generally to generating images and providing try-on experiences using an interaction application.

BACKGROUND

Augmented reality (AR) is a modification of a real-world environment with the addition or overlay of virtual content. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
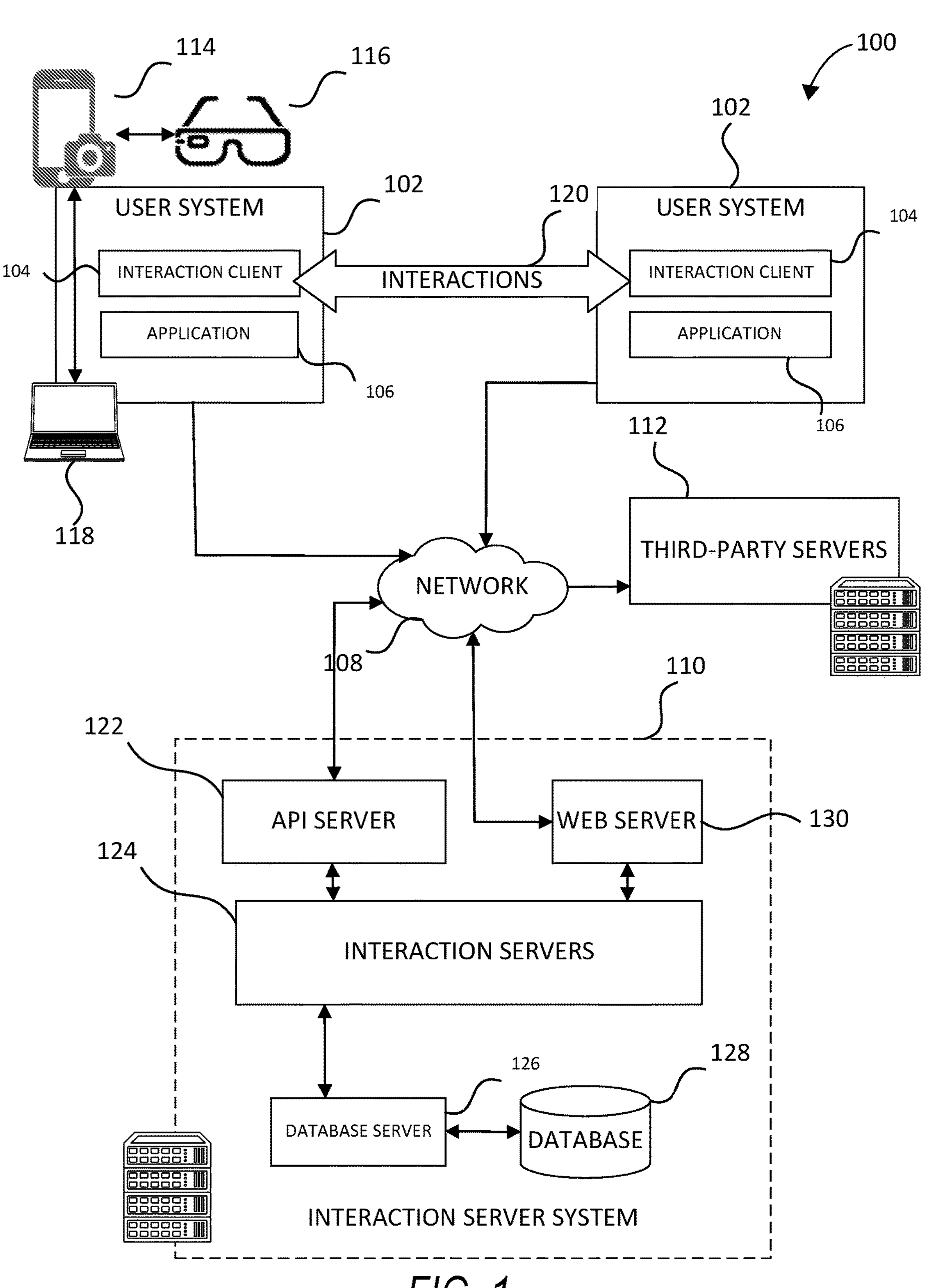
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, messaging applications and other social network platforms allow users to view a live or real-time camera feed that depicts the users wearing different items. For example, a user can activate a virtual try-on experience in which one or more AR items are placed on the user depicted in the image in real-time. This provides a user with the ability to visualize how different products look on the user before the user purchases the products. Sometimes the items being tried on and depicted as being worn by the users are small and hard to see in the image that is captured by the camera of the device used to present the try-on experience. To get a better idea of how the object looks on the user, the user needs to bring the camera closer to the object of interest, which enlarges the view of the object in the main camera feed. However, bringing the camera closer also means that the perspective changes and the entire view of the user's face or whole body, for example, is no longer present.

For example, a user may be wearing shoes and may be depicted as wearing the shoes in a camera feed captured by a rear-facing camera of the device. The camera of the device may be pointed at the feet of the user to view the shoes. However, because the camera is being held in the user's hands while the user is standing up, the lenses of the camera are relatively far from the feet which result in the display of distorted images or images in which the shoes on the feet appear relative small. This makes it difficult to see intricate details of the shoes. To get a better view of the shoes, the user has to manipulate the phone in awkward ways to bring the phone very close to the feet of interest on which the shoes are being worn. This causes a distorted image to be presented and features of the user are no longer visible. This makes it difficult for the user to understand and visualize accurately how the shoes look on the user. Also maneuvering the camera and the device with the camera in awkward ways to get the right close-up picture of the shoes takes time and is very distracting from the overall experience. Sometimes, foot or feet tracking information used to generate a display of the shoes (in case of AR shoes) is entirely lost when the camera is brought too close to the AR shoes and no longer captures the image of the shoes. When this happens, the AR shoes begin to behave erratically or can be entirely removed from the displayed image, which takes away from the overall illusion that the shoes are part of the real-world image captured by the camera.

The disclosed techniques seek to improve the efficiency of using an electronic device by directing a camera (e.g., a stand-alone or integrated camera) at a floor or area in which feet generally appear. The camera feed is then routed to a display screen which can be placed at eye-level of a user. In response to detecting one or more feet and/or shoes in the real-time camera feed, the display screen is activated to present to the user a close up view of the one or more feet and/or shoes in a simple and intuitive manner. This allows a user to visualize how different shoes (e.g., AR shoes) look on the user's feet without having to maneuver a camera in awkward ways or move around in the field of view of the camera to properly position the user's feet. In this way, the overall user experience is improved and the amount of resources needed to accomplish a task is reduced.

This can reduce the overall time and expense incurred by users trying on different fashion items that are real-world fashion items or AR fashion items, such as shoes, shirts, earrings, watches or other fashion items. As used herein, "article of clothing," "fashion item," and "garment" are used interchangeably and should be understood to have the same meaning. Article of clothing, garment, or fashion item can include a shirt, skirt, dress, shoes, purse, furniture item, household item, eyewear, eyeglasses, AR logos, AR emblems, pants, shorts, jackets, t-shirts, blouses, glasses, jewelry, earrings, bunny ears, a hat, earmuffs, or any other suitable item or object.

Specifically, the disclosed techniques access a video stream captured by a camera directed at feet of users. The disclosed techniques detect a depiction of one or more feet of a user in the video stream captured by the camera. The disclosed techniques, in response to detecting the one or more feet in the video stream captured by the camera, activate a display screen that is positioned at an eye-level of the user and presents the video stream including the depiction of the one or more feet of the user on the display screen. This improves the overall experience of the user in using the electronic device and reduces the overall amount of system resources needed to accomplish a task.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a *ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
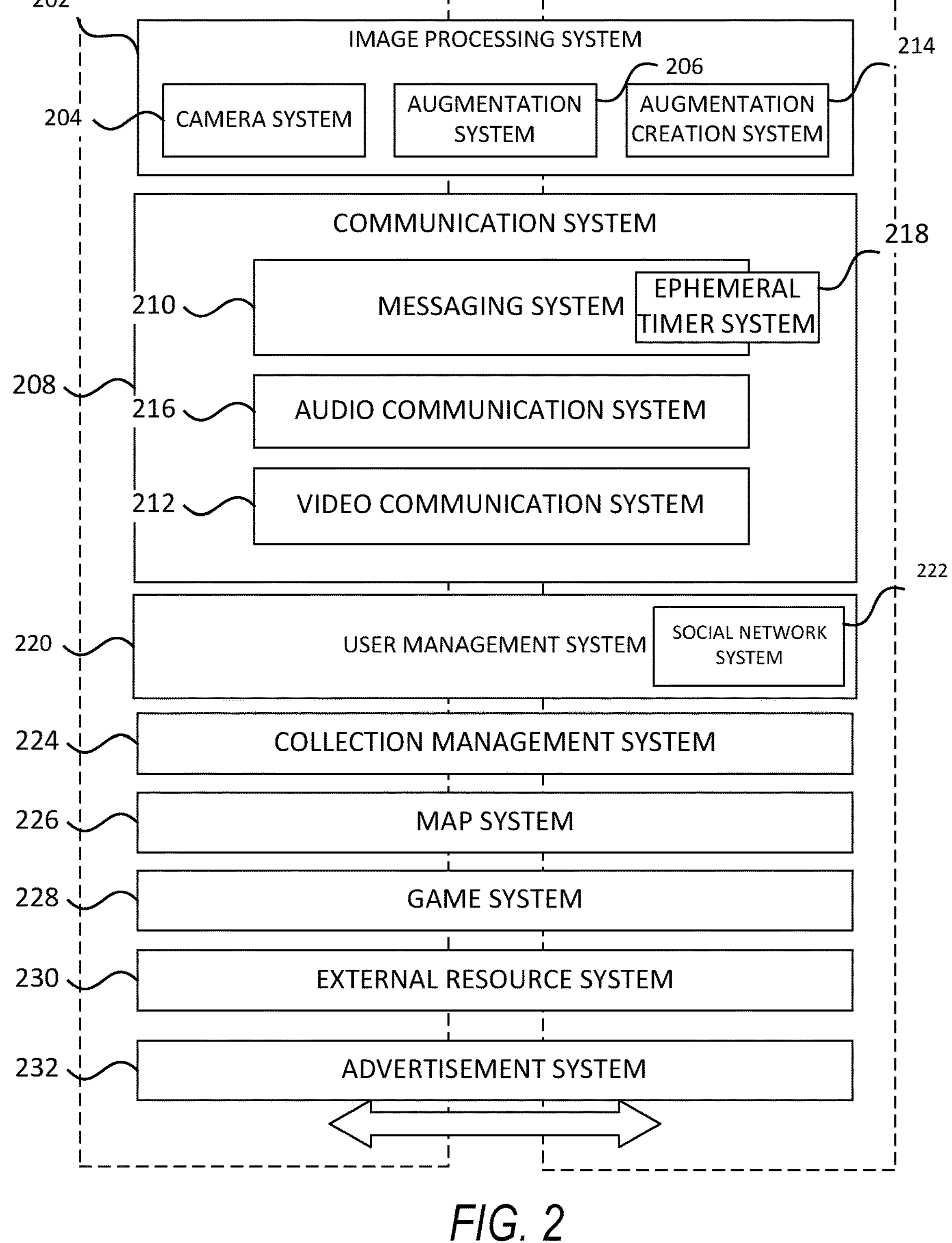
FIG. 2 is a diagrammatic representation of an interaction application, in accordance with some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below and can include a browsing-based AR system 500 that enables a user to launch an AR experience in which a video depicting a user of the user system 102 is modified to overlay an AR fashion item corresponding to a fashion item presented in a GUI. An illustrative implementation of the browsing-based AR system 500 is shown and described in connection with FIG. 5 below.

Specifically, the browsing-based AR system 500 is a component that can be accessed by an AR/VR application implemented on the user system 102. The AR/VR application uses an RGB camera to capture a monocular image of a real-world object. The AR/VR application applies various trained machine learning techniques or machine learning models on the captured image of the real-world object to generate body landmark features representing the real-world object depicted in the images or videos and to apply one or more AR visual effects to the captured image or video based on body landmark features. In some implementations, the AR/VR application continuously captures images of the user and updates the body landmark features in real time or periodically to continuously or periodically update the applied one or more visual effects. This allows the user to move around in the real world and see the one or more visual effects update in real time.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1006 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., to delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

A footwear mirror system 500 accesses a video stream captured by a camera directed at feet of users. The footwear mirror system 500 detects a depiction of one or more feet of a user in the video stream captured by the camera. The footwear mirror system 500, in response to detecting the one or more feet in the video stream captured by the camera, activates a display screen that is positioned at an eye-level of the user and presents the video stream including the depiction of the one or more feet of the user on the display screen.

Data Architecture

Figure 3:
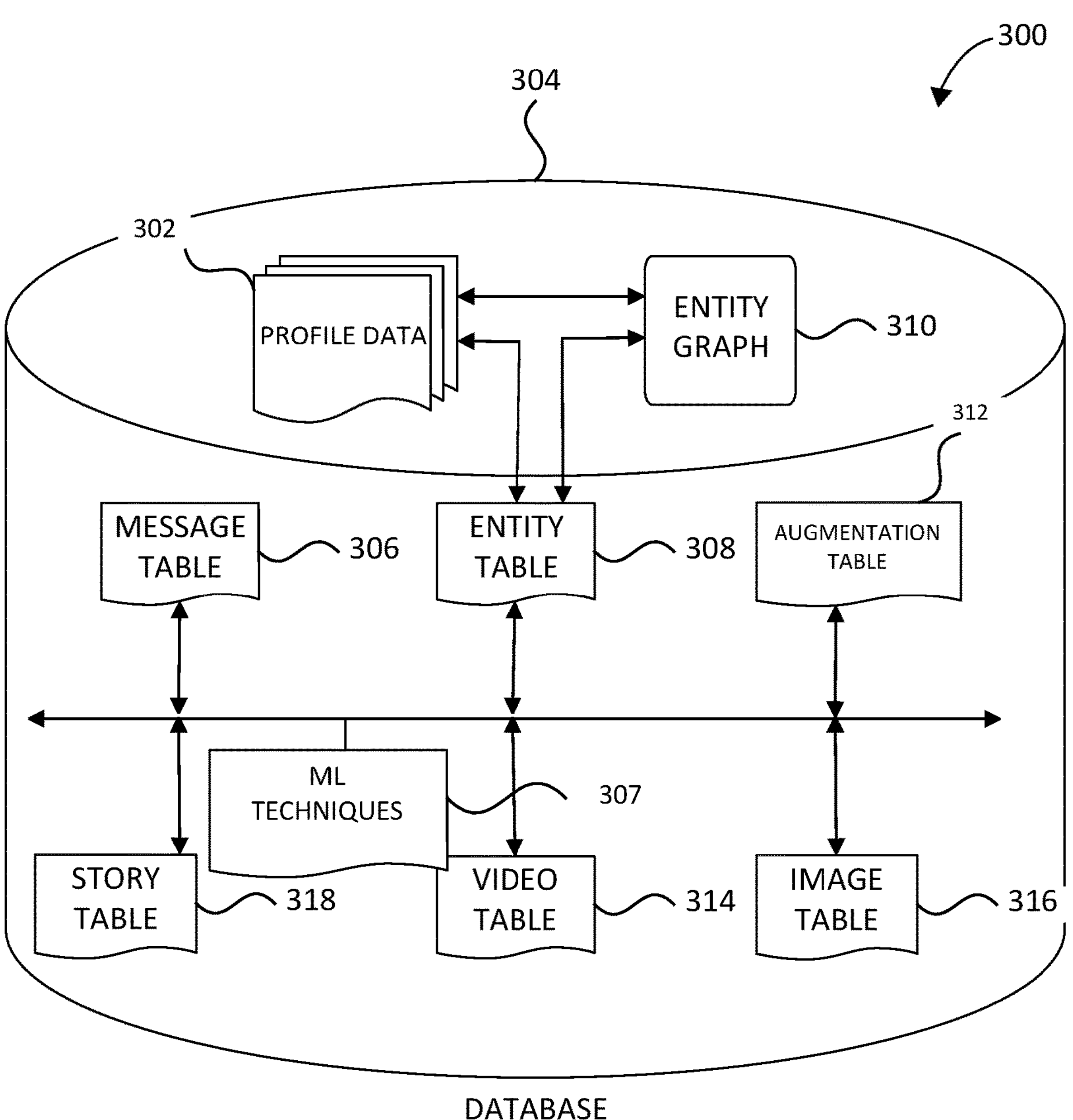
FIG. 3 is a diagrammatic representation of a data structure as maintained in a database, in accordance with some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained machine learning (ML) technique(s) 307 that stores parameters of one or more machine learning models that have been trained during training of the fashion item transfer system 500. For example, trained machine learning techniques 307 stores the trained parameters of one or more artificial neural network machine learning models or techniques.

Data Communications Architecture

Figure 4:
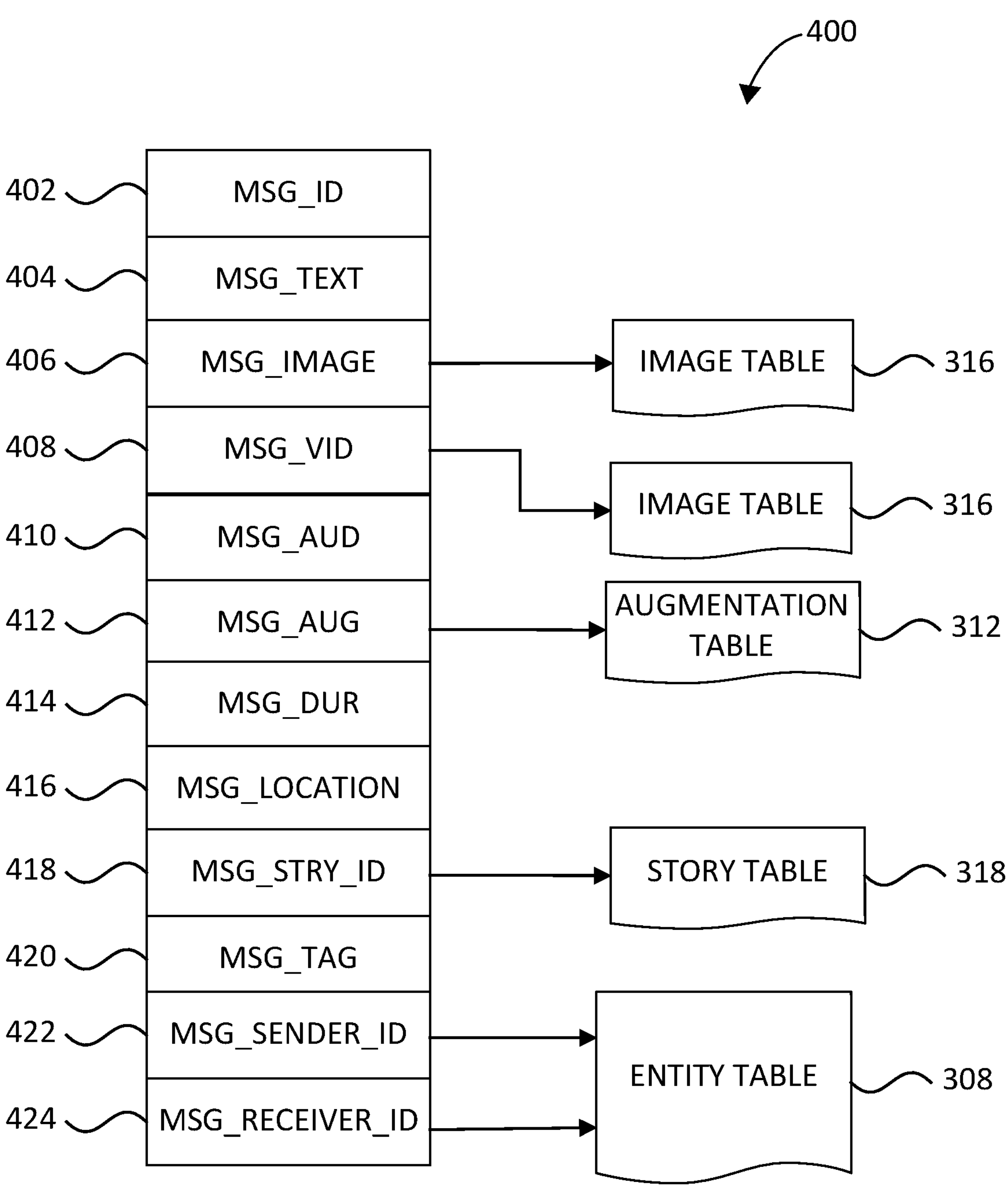
FIG. 4 is a diagrammatic representation of a message, in accordance with some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.
- Message duration parameter 414: parameter value indicating, in seconds, the amount of time for which content of the message (e.g., the message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.
- Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Footwear Mirror System

Figure 5:
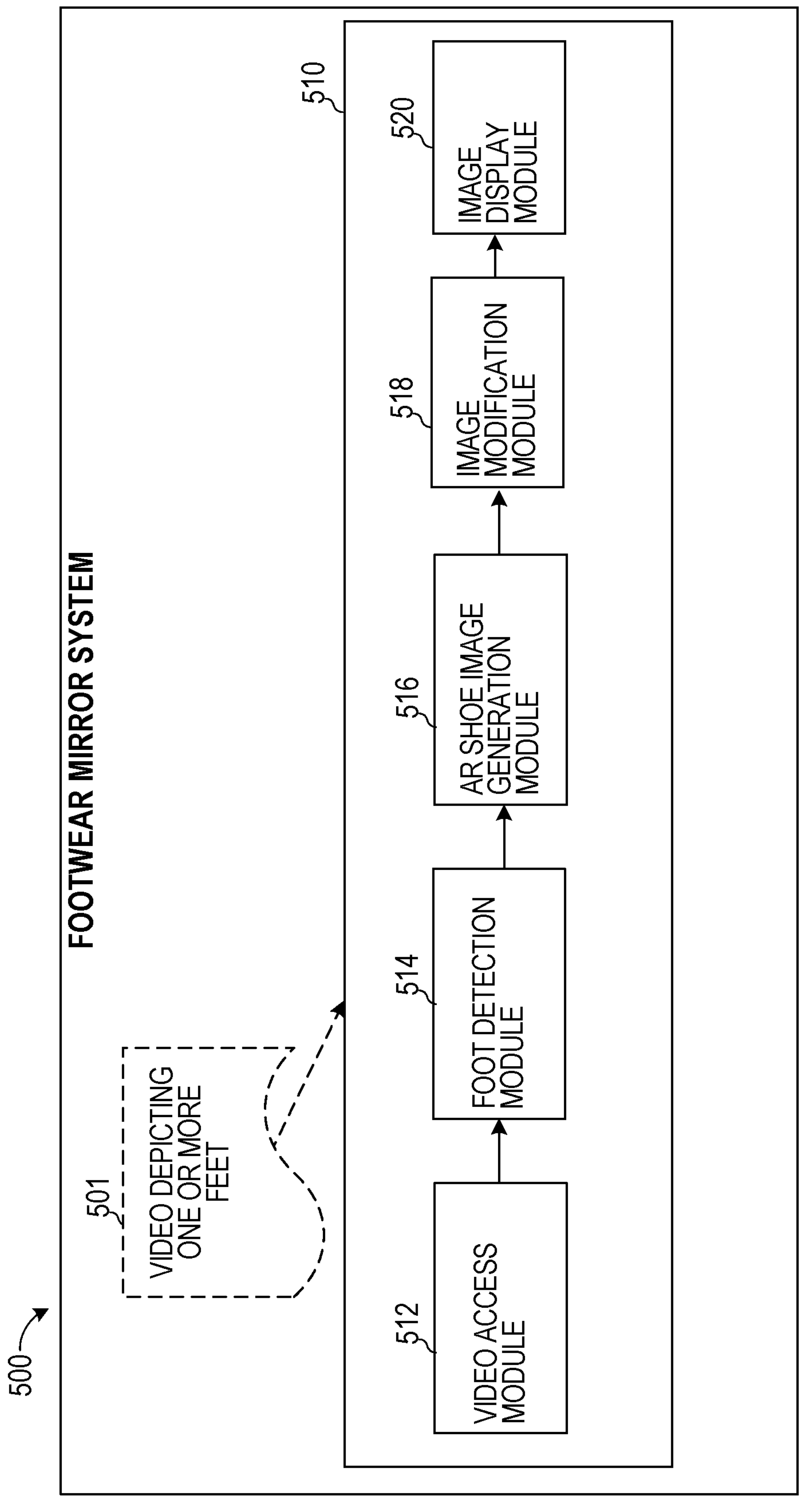
FIG. 5 is a block diagram showing an example footwear mirror system, according to some examples.

FIG. 5 is a block diagram showing an example footwear mirror system 500, according to example examples. The footwear mirror system 500 includes a set of components 510 that operate on a set of input data (e.g., a video 501 including one or more frames depicting one or more feet of a person wearing a real-world object or AR object, such as a fashion item or shoes). The footwear mirror system 500 includes a video access module 512, a foot detection module 514, an AR shoe image generation module 516, an image modification module 518, and an image display module 520. All or some of the components of the footwear mirror system 500 can be implemented by a server, in which case, the video 501 is provided to the server by the user system 102. In some cases, some or all of the components of the footwear mirror system 500 can be implemented by the user system 102 or can be distributed across a set of user systems 102.

In some examples, the footwear mirror system 500 accesses a video stream captured by a camera directed at feet of users. The footwear mirror system 500 detects a depiction of one or more feet of a user in the video stream captured by the camera using object recognition techniques. The footwear mirror system 500, in response to detecting the one or more feet in the video stream captured by the camera, activates a display screen that is positioned, at least partly, at an eye-level of the user. The footwear mirror system 500 presents the video stream including the depiction of the one or more feet of the user on the display screen.

In some examples, the camera is placed at a first specified distance from a floor level and the display screen is placed at a second specified distance from the floor level. The second specified distance can be greater than the first specified distance. In some examples, the footwear mirror system 500 detects a foot gesture performed by the one or more feet in the video stream and triggers activation of the display screen to present the video stream in response to detecting the foot gesture, such as tapping the heels of the feet together.

In some examples, the footwear mirror system 500 detects a fashion item being worn on the one or more feet of the user in the video. The footwear mirror system 500 extracts, from the video, a portion including the depiction of the fashion item. In some examples, the footwear mirror system 500 receives input that activates an AR experience associated with trying on shoes. The footwear mirror system 500, in response to the input, adds an AR shoe to the depiction of the one or more feet in the video captured by the camera.

In some examples, the footwear mirror system 500 modifies the video stream presented to the user on the display screen to depict the AR shoe that has been added to the depiction of the one or more feet. In some examples, the footwear mirror system 500 receive a selection of the AR shoe from a list of AR shoes presented on the display screen.

In some examples, the AR shoe is a first AR shoe. In such cases, the footwear mirror system 500 detects a gesture associated with the one or more feet depicted in the video stream and selects a second AR shoe from the list of AR shoes in response to detecting the gesture. In some examples, the footwear mirror system 500 adds the second AR shoe instead of the first AR shoe to the depiction of the one or more feet.

In some examples, the gesture includes touch input of a portion of the display screen. In some examples, the gesture includes a foot gesture performed by the one or more feet depicted in the video stream. In some examples, the second AR shoe corresponds to a different style or color of the first AR shoe.

In some examples, the camera is coupled to the display screen via one or more external wires. In some examples, the display screen includes a full body display screen that is placed on a floor of a real-world environment. In such cases, the camera is integrated to the display screen at a bottom of the display screen.

In some examples, the footwear mirror system 500 applies one or more machine learning models to the depiction of the one or more feet in the video stream to estimate a shoe size of the one or more feet. The footwear mirror system 500 selects an AR shoe associated with the estimated shoe size in response to applying the one or more machine learning models to the depiction of the one or more feet. In some examples, the footwear mirror system 500 overlays the AR shoe on the depiction of the one or more feet in the video stream to present the video stream including the depiction of the one or more feet of the user and the AR shoe on the display screen.

For example, the video access module 512 can access a real-time camera feed from a front-facing or rear-facing camera of the user system 102. In some cases, the video access module 512 accesses a video feed from a foot camera (e.g., a camera integrated into a bottom portion of a whole body display screen or a camera placed or physically positioned on a floor level, such as 5 inches above the floor surface). The camera feed can depict a real-world person or a body part of a real-world person, such as one or more feet of the person. The video access module 512 provides the camera feed that includes one or more frames that depict the person or body part of the person to the foot detection module 514.

Figure 6:
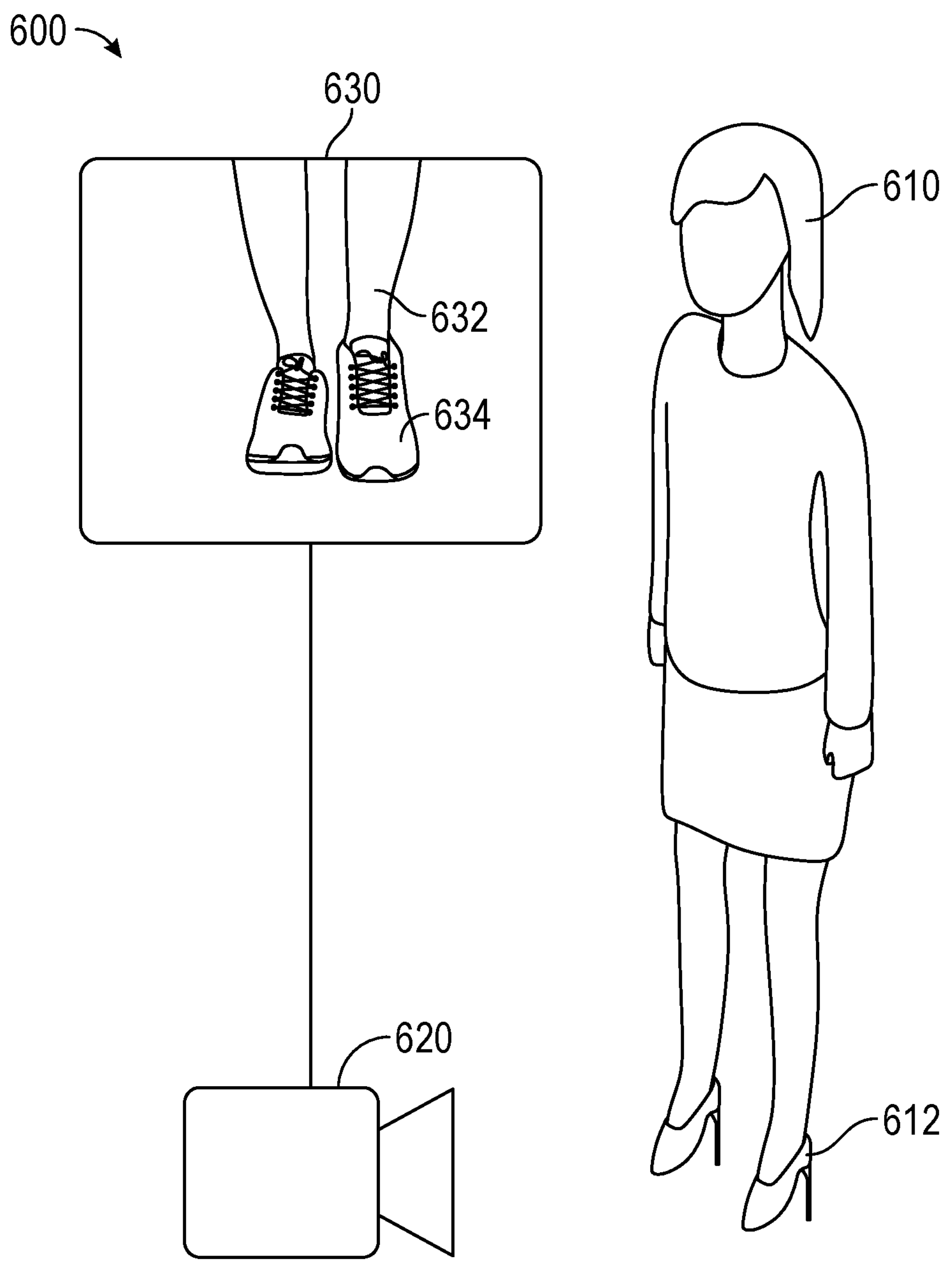
FIGS. 6-8 are diagrammatic representations of inputs and outputs of the footwear mirror system, in accordance with some examples.

For example, as shown in the system 600 of FIG. 6, the video access module 512 receives a video feed from a camera 620 that includes a frame that depicts one or more feet 612 of a person 610. The video feed can be provided or routed from the camera 620 to a display screen 630. The display screen 630 is physically placed at an eye or face level of the person 610, such as 5 feet above a floor surface where the camera 620 is placed. The display screen 630 conditionally presents one or more images or a video feed received from the camera 620. The one or more images depict a portion of the person 610 (e.g., legs 632 of the person 610) and shoes 634. In some cases, the shoes 634 are the real-world shoes worn on the one or more feet 612 of the person 610. In some cases, the shoes 634 are AR shoes resembling the real-world shoes worn on the one or more feet 612. In some cases, the shoes 634 correspond to AR shoes selected by the person 610 and presented on top of the one or more feet 612 depicted in the images captured and received from the camera 620.

Figure 7:
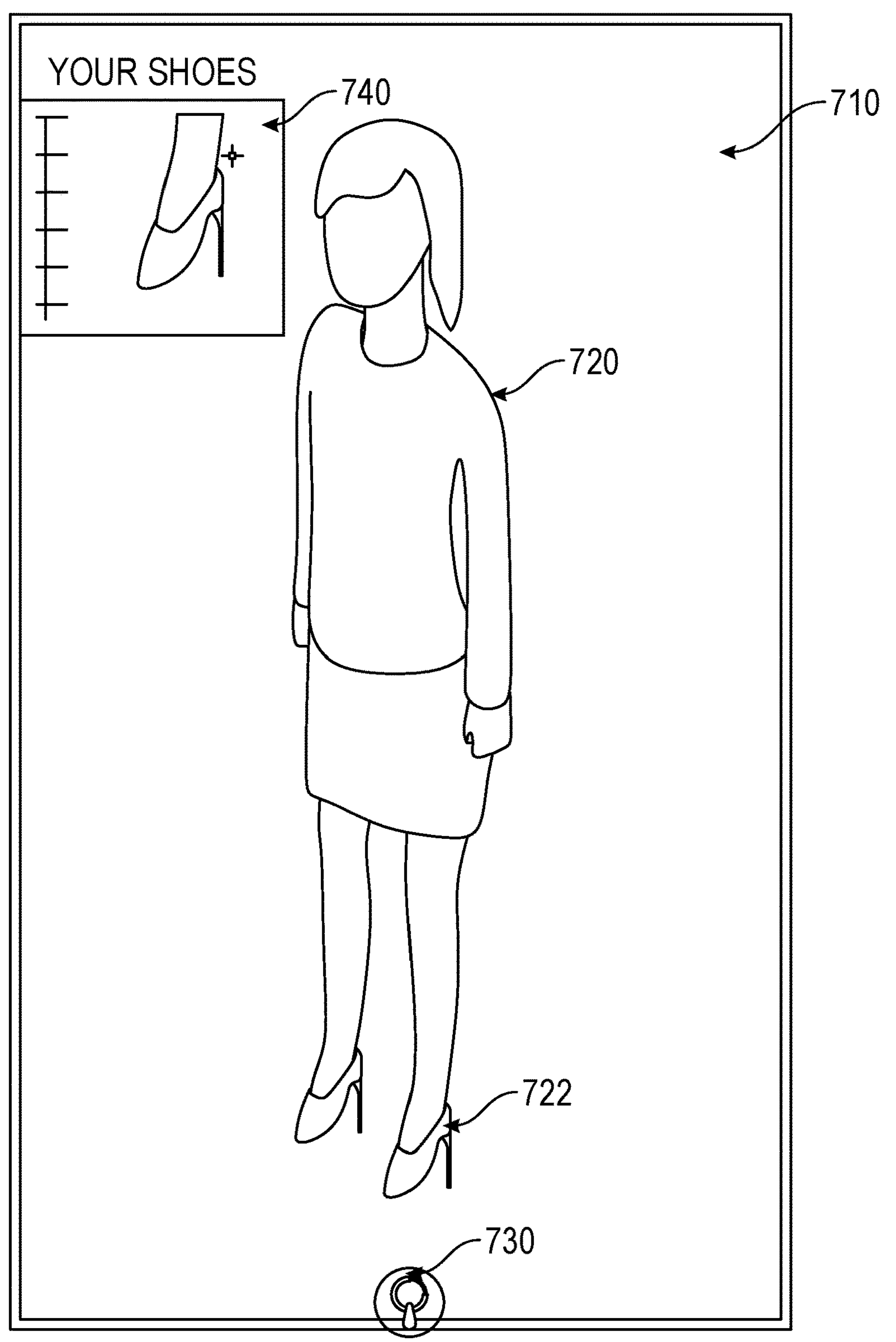

As another example, as shown in the system 700 of FIG. 7, the video access module 512 receives a video feed from a foot camera 730 that includes a frame that depicts one or more shoes 722 of a person 720. The video feed can be provided or routed from the camera 730 to a dedicated or predetermined portion 740 of a display screen 710. The display screen 710 can correspond to a whole-body or full body display screen which makes it look to a user as a full length mirror. The display screen 710 can include an integrated camera at a top portion of the display that captures a full length image of the person 720 and presents the image on the display screen 710.

The image or video captured by the camera 730 (placed at a bottom portion of the display screen 710) is displayed in the portion 740 (e.g., a window) that is physically placed at an eye or face level of the person 720. The image or video can be conditionally presented in the dedicated or predetermined portion 740 of the display screen 710. In some examples, the one or more images displayed in the dedicated or predetermined portion 740 can depict a portion of the person 720 (e.g., legs of the person 720) and shoes. In some cases, the shoes shown in the dedicated or predetermined portion 740 can be the real-world shoes 722 worn on the one or more feet of the person 720. In some cases, the shoes are AR shoes resembling the real-world shoes 722 worn on the one or more feet of the person 720. In some cases, the shoes can correspond to AR shoes selected by the person 720 and presented on top of the one or more feet depicted in the images captured and received from the camera 730.

Referring back to FIG. 5, the foot detection module 514 implements one or more machine learning models (e.g., one or more neural networks) that have been trained to detect and track one or more feet in one or more video frames. For example, during training, the machine learning model of the foot detection module 514 receives a given training image (or video) from a plurality of training images (or videos) that depict one or more persons and their feet. The plurality of training images is associated with corresponding ground truth markers or indications of the feet depicted in the training images and can be received or accessed from training image data stored in data structures 300. The foot detection module 514 applies one or more machine learning models to a given training image. The foot detection module 514 generates estimated tracking information for a foot depicted in the given training image.

The foot detection module 514 obtains known or predetermined ground-truth tracking information corresponding to the given training image. The foot detection module 514 compares (computes a deviation between) the estimated tracking information with the ground truth tracking information. Based on a difference threshold of the comparison (or deviation), the foot detection module 514 updates one or more coefficients or parameters and obtains one or more additional training images from the training data.

After a specified number of epochs or batches of training images have been processed and/or when a difference threshold (or deviation) (computed as a function of a difference or deviation between the estimated tracking information and the ground-truth tracking information) reaches a specified value, the foot detection module 514 completes training, and the parameters and coefficients of the foot detection module 514 are stored as a trained machine learning technique.

In some examples, the foot detection module 514 can be used to detect one or more feet in an image of a real-world environment. The foot detection module 514 can trigger the display of the images captured and received from a foot camera, such as the camera 620 or the camera 730. The images can be presented on a dedicated portion of a display screen that is on the eye-level of a user or on a dedicated screen, such as a handheld screen or a stationary display that is on the eye-level of the user. In some examples, the foot detection module 514 can provide tracking information for one or more feet estimated from the captured images of the camera 620 or the camera 730 to the AR shoe image generation module 516. The AR shoe image generation module 516 can then overlay one or more AR shoes on the feet depicted in the images based on the estimated tracking information received from the foot detection module 514. This results in an augmented image being generated by the image modification module 518 which modifies the image received from the camera 620 or the camera 730. The modified image can be routed to the image display module 520 for presentation on the dedicated portion of a display screen that is on the eye-level of a user or on a dedicated screen, such as a handheld screen or a stationary display that is on the eye-level of the user.

In some examples, the AR shoe image generation module 516 can augment a received image or video with a fashion item corresponding to an AR experience, such as an AR shoe, by overlaying one or more AR fashion items on the received image or video, such as over one or more feet depicted in the images. The foot detection module 514 can track a real-world object of interest (e.g., feet) of a person using one or more previously trained machine learning models and can place real-world shoes worn by the person with the AR object (e.g., AR shoes) relative to the tracked real-world object of interest.

In some examples, the foot detection module 514 can extract or crop out a portion of an image captured and received from the camera 620 or the camera 730. The foot detection module 514 can extract one or more feet depicted in the cropped images and can apply one or more machine learning models to the feet to estimate a shoe size associated with the feet. The machine learning models can be trained based on training data of different sized feet and shoes to estimate or predict a shoe size for a new foot that appears in a new image. The foot detection module 514 can provide the estimated shoe size to the AR shoe image generation module 516. The AR shoe image generation module 516 can receive input from a user that selects an AR shoe, such as from an on-screen menu. The AR shoe image generation module 516 can identify an AR shoe that corresponds to the estimated shoe size and present or overlay the AR shoe on the portion of the image where the foot is detected and tracked. This results in a display that provides the illusion to the user that the AR shoe is actually part of the real-world environment depicted in the images.

In some examples, the foot detection module 514 can detect one or more gestures performed by the one or more feet depicted in the images. For example, the foot detection module 514 can determine that the one or more feet are moved to tap each other. In response, the foot detection module 514 can transmit an instruction to the AR shoe image generation module 516 to alter or change the AR shoe currently being shown to have a different look, such as a different color, style, or size. Each time the same gesture is detected, the foot detection module 514 instructs the AR shoe image generation module 516 to change the color, style or size of the AR shoe being presented on the screen.

Figure 8:
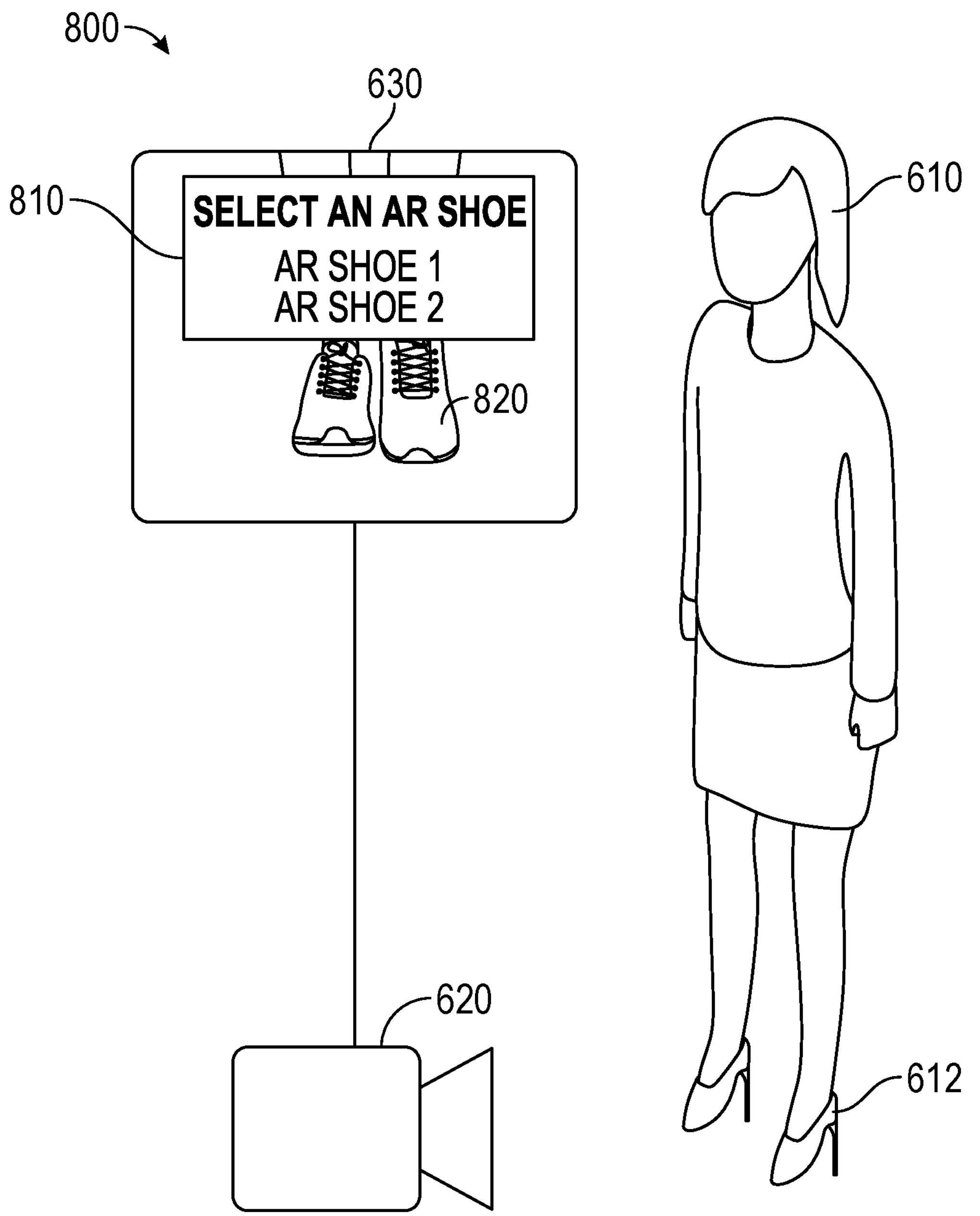

In some examples, in addition to detecting foot gestures or in the alternative, the AR shoe image generation module 516 can receive input from the user who taps certain regions of a screen corresponding to different AR shoes. Each time the user taps on another region or speaks a command to change the AR shoes, the AR shoe image generation module 516 updates and changes the AR shoe currently being shown with another AR shoe, such as one corresponding to the received input. For example, as shown in the system 800 of FIG. 8, the display screen 630 presents a menu 810 of AR shoes. The AR shoe image generation module 516 can receive input that selects a given AR shoe from the menu 810. In response, the AR shoe image generation module 516 updates the AR shoes 820 shown in the display screen 630 with a new AR shoe.

Figure 9:
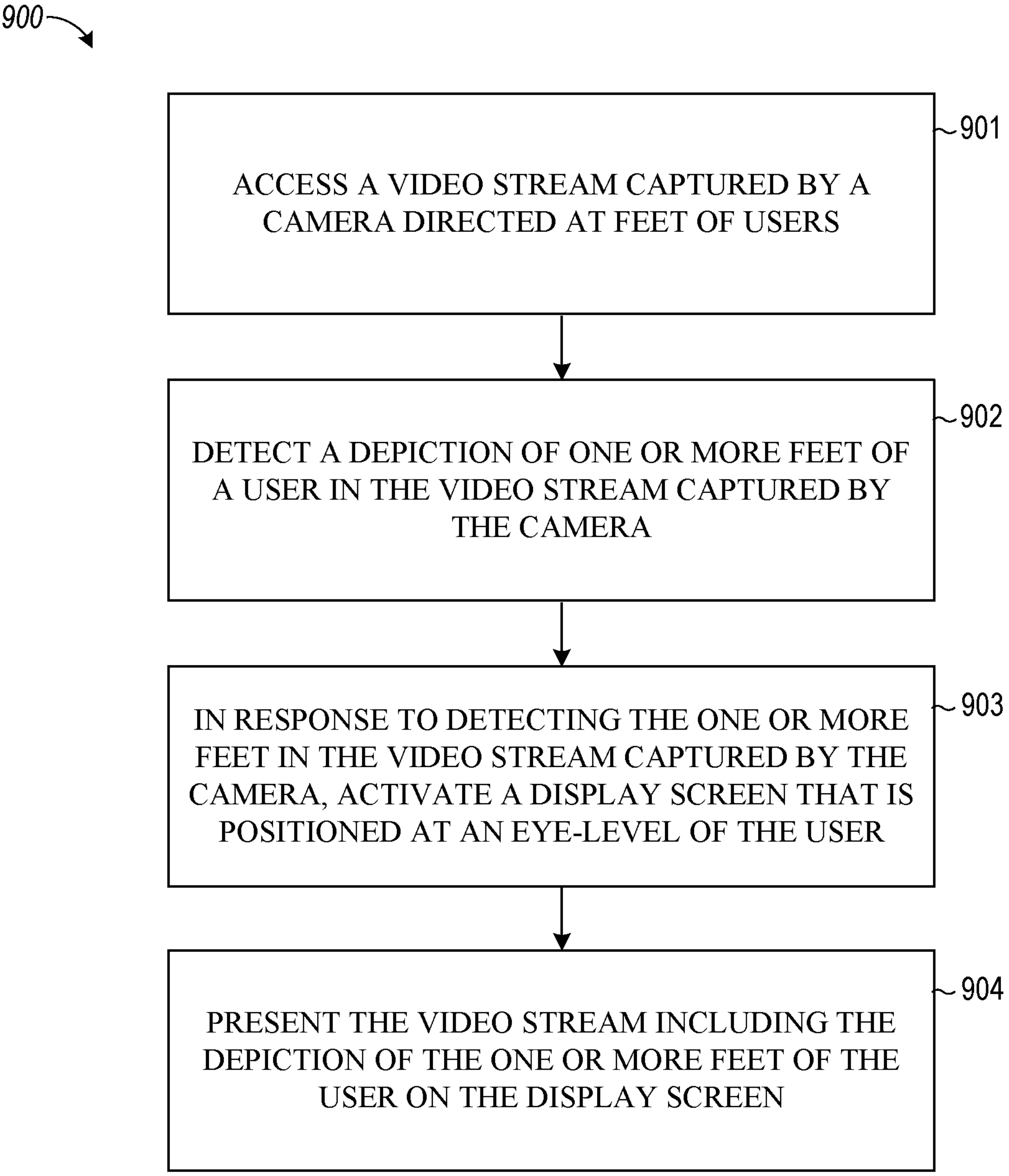
FIG. 9 is a flowchart illustrating example operations of the footwear mirror system, according to some examples.

FIG. 9 is a flowchart of a process 900, in accordance with some examples. Although the flowchart describes the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the footwear mirror system 500 (e.g., a server or user system 102) accesses a video stream captured by a camera directed at feet of users, as discussed above.

At operation 902, the footwear mirror system 500 detects a depiction of one or more feet of a user in the video stream captured by the camera, as discussed above.

At operation 903, the footwear mirror system 500, in response to detecting the one or more feet in the video stream captured by the camera, activates a display screen that is positioned at an eye-level of the user, as discussed above.

At operation 904, the footwear mirror system 500 presents the video stream including the depiction of the one or more feet of the user on the display screen, as discussed above.

Machine Architecture

Figure 10:
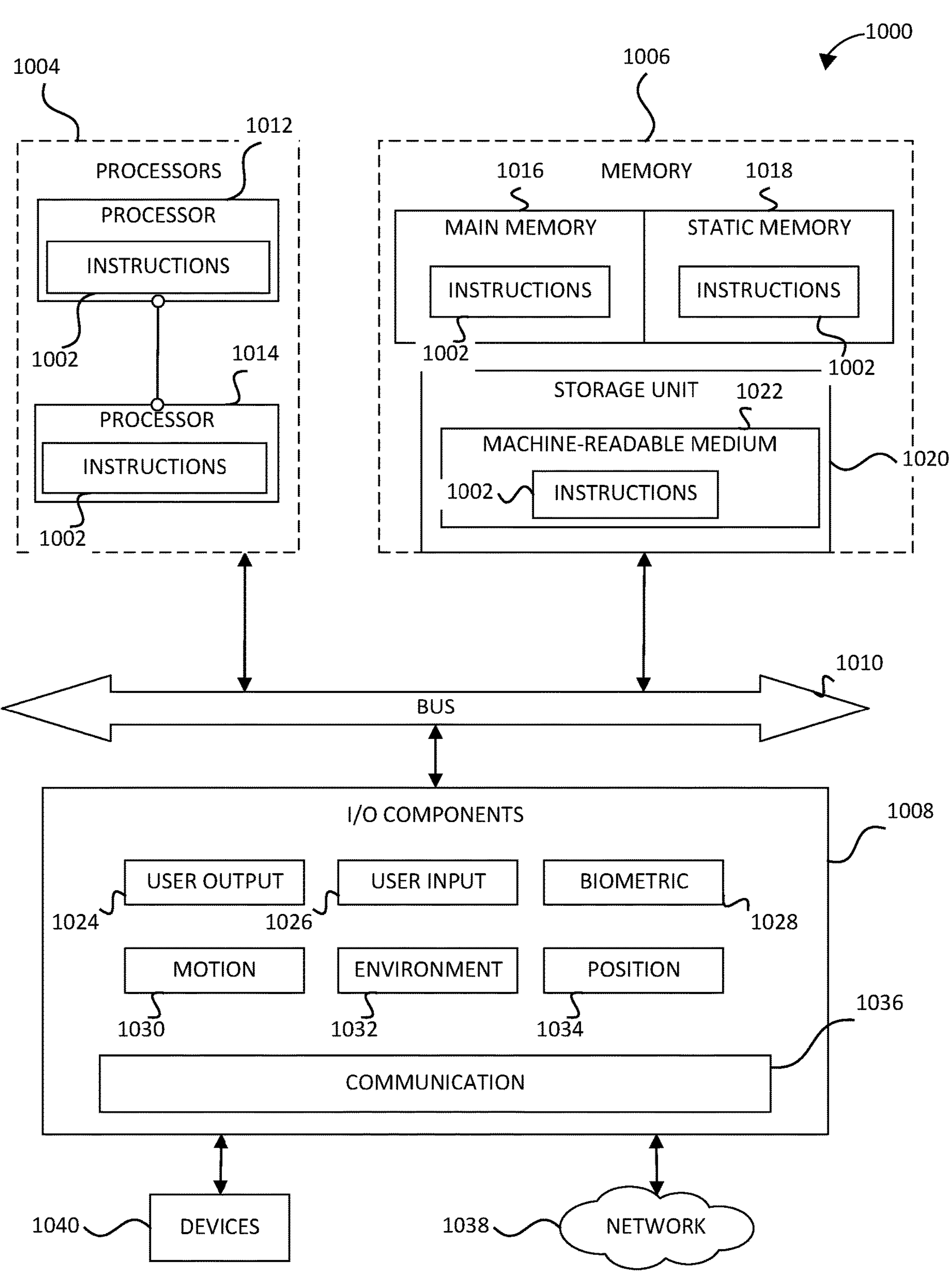
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
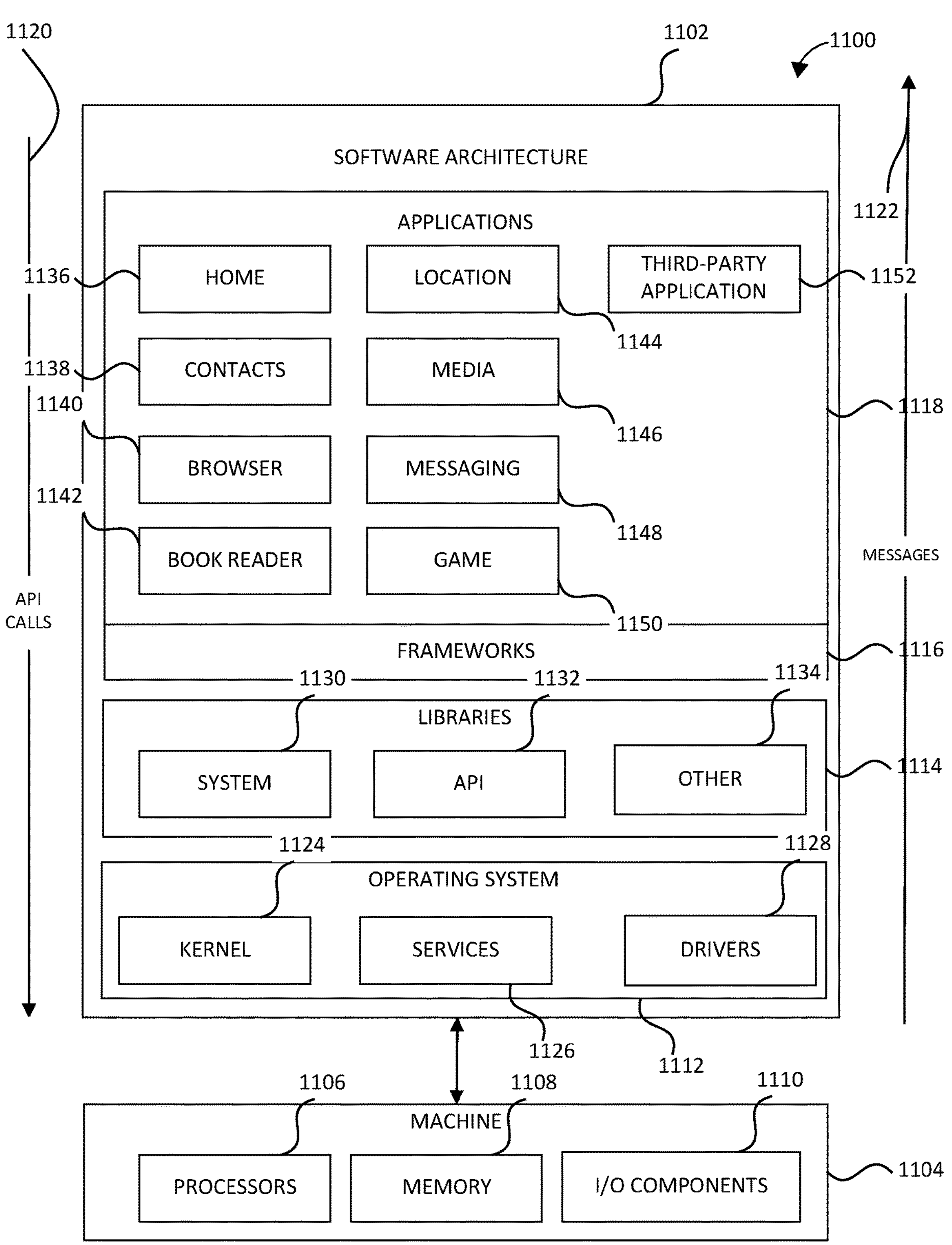
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

System with Head-Wearable Apparatus

Figure 12:
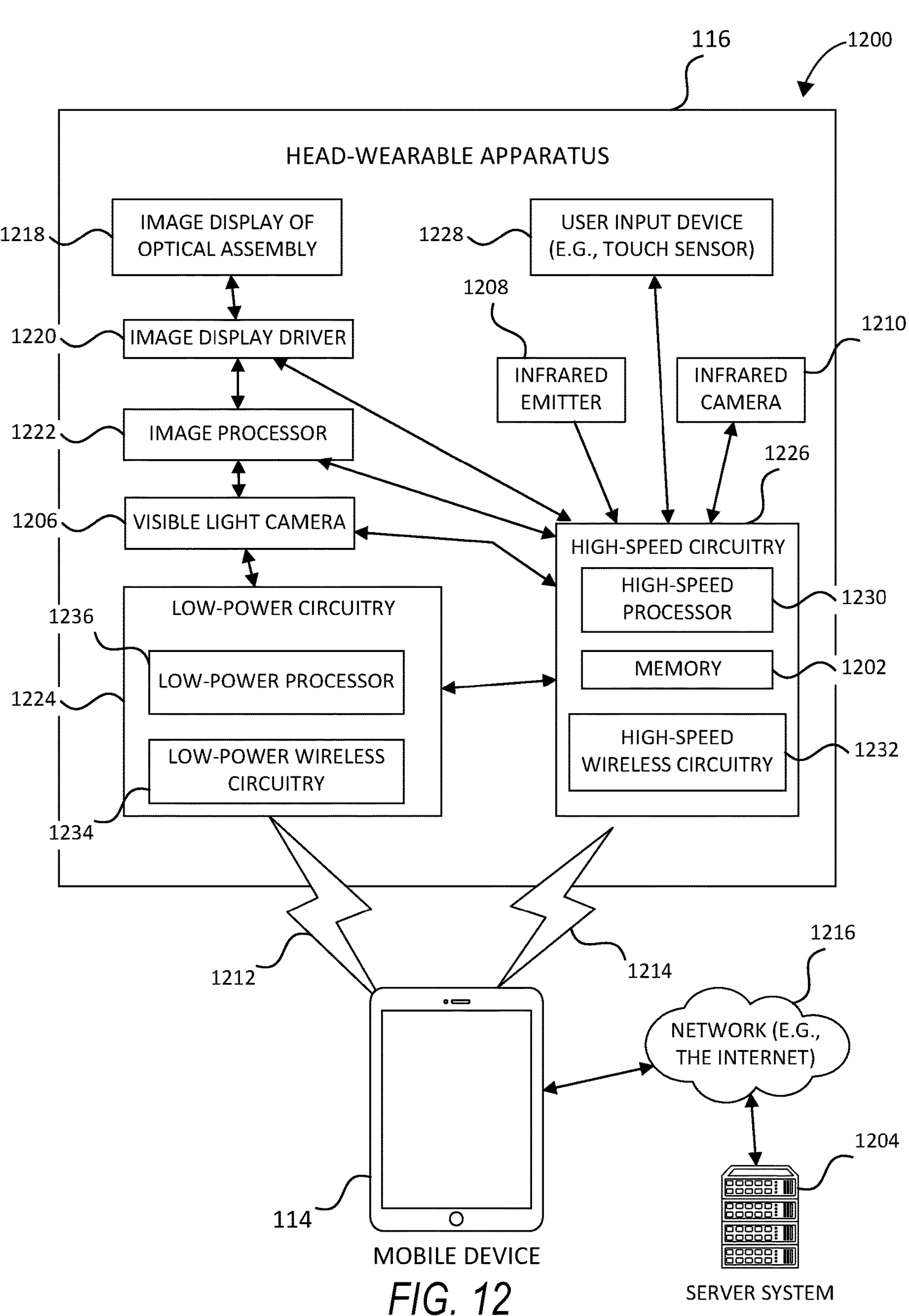
FIG. 12 illustrates a system in which the head-wearable apparatus, according to some examples.

FIG. 12 illustrates a system 1200 including a head-wearable apparatus 116 with a selector input device, according to some examples. FIG. 12 is a high-level functional block diagram of an example head-wearable apparatus 116 communicatively coupled to a mobile device 114 and various server systems 1204 (e.g., the interaction server system 110) via various networks 108.

The head-wearable apparatus 116 includes one or more cameras, each of which may be, for example, a visible light camera 1206, an infrared emitter 1208, and an infrared camera 1210.

The mobile device 114 connects with head-wearable apparatus 116 using both a low-power wireless connection 1212 and a high-speed wireless connection 1214. The mobile device 114 is also connected to the server system 1204 and the network 1216.

The head-wearable apparatus 116 further includes two image displays of the image display of optical assembly 1218. The two image displays of optical assembly 1218 include one associated with the left lateral side and one associated with the right lateral side of the head-wearable apparatus 116. The head-wearable apparatus 116 also includes an image display driver 1220, an image processor 1222, low-power circuitry 1224, and high-speed circuitry 1226. The image display of optical assembly 1218 is for presenting images and videos, including an image that can include a graphical user interface to a user of the head-wearable apparatus 116.

The image display driver 1220 commands and controls the image display of optical assembly 1218. The image display driver 1220 may deliver image data directly to the image display of optical assembly 1218 for presentation or may convert the image data into a signal or data format suitable for delivery to the image display device. For example, the image data may be video data formatted according to compression formats, such as H.264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1228 (e.g., touch sensor or push button), including an input surface on the head-wearable apparatus 116. The user input device 1228 (e.g., touch sensor or push button) is to receive from the user an input selection to manipulate the graphical user interface of the presented image.

The components shown in FIG. 12 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1206 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1202, which stores instructions to perform a subset or all of the functions described herein. The memory 1202 can also include storage device.

As shown in FIG. 12, the high-speed circuitry 1226 includes a high-speed processor 1230, a memory 1202, and high-speed wireless circuitry 1232. In some examples, the image display driver 1220 is coupled to the high-speed circuitry 1226 and operated by the high-speed processor 1230 in order to drive the left and right image displays of the image display of optical assembly 1218. The high-speed processor 1230 may be any processor capable of managing high-speed communications and operation of any general computing system needed for the head-wearable apparatus 116. The high-speed processor 1230 includes processing resources needed for managing high-speed data transfers on a high-speed wireless connection 1214 to a wireless local area network (WLAN) using the high-speed wireless circuitry 1232. In certain examples, the high-speed processor 1230 executes an operating system such as a LINUX operating system or other such operating system of the head-wearable apparatus 116, and the operating system is stored in the memory 1202 for execution. In addition to any other responsibilities, the high-speed processor 1230 executing a software architecture for the head-wearable apparatus 116 is used to manage data transfers with high-speed wireless circuitry 1232. In certain examples, the high-speed wireless circuitry 1232 is configured to implement Institute of Electrical and Electronic Engineers (IEEE) 802.11 communication standards, also referred to herein as WiFi. In some examples, other high-speed communications standards may be implemented by the high-speed wireless circuitry 1232.

The low-power wireless circuitry 1234 and the high-speed wireless circuitry 1232 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1212 and the high-speed wireless connection 1214, may be implemented using details of the architecture of the head-wearable apparatus 116, as can other elements of the network 1216.

The memory 1202 includes any storage device capable of storing various data and applications, including, among other things, camera data generated by the left and right visible light cameras 1206, the infrared camera 1210, and the image processor 1222, as well as images generated for display by the image display driver 1220 on the image displays of the image display of optical assembly 1218. While the memory 1202 is shown as integrated with high-speed circuitry 1226, in some examples, the memory 1202 may be an independent standalone element of the head-wearable apparatus 116. In certain such examples, electrical routing lines may provide a connection through a chip that includes the high-speed processor 1230 from the image processor 1222 or the low-power processor 1236 to the memory 1202. In some examples, the high-speed processor 1230 may manage addressing of the memory 1202 such that the low-power processor 1236 will boot the high-speed processor 1230 any time that a read or write operation involving memory 1202 is needed.

As shown in FIG. 12, the low-power processor 1236 or high-speed processor 1230 of the head-wearable apparatus 116 can be coupled to the camera (visible light camera 1206, infrared emitter 1208, or infrared camera 1210), the image display driver 1220, the user input device 1228 (e.g., touch sensor or push button), and the memory 1202.

The head-wearable apparatus 116 is connected to a host computer. For example, the head-wearable apparatus 116 is paired with the mobile device 114 via the high-speed wireless connection 1214 or connected to the server system 1204 via the network 1216. The server system 1204 may be one or more computing devices as part of a service or network computing system, for example, that includes a processor, a memory, and network communication interface to communicate over the network 1216 with the mobile device 114 and the head-wearable apparatus 116.

The mobile device 114 includes a processor and a network communication interface coupled to the processor. The network communication interface allows for communication over the network 1216, low-power wireless connection 1212, or high-speed wireless connection 1214. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1220. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1204, such as the user input device 1228, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1212 and high-speed wireless connection 1214 from the mobile device 114 via the low-power wireless circuitry 1234 or high-speed wireless circuitry 1232.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. "Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium,"

"device-storage medium," "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. Changes and modifications may be made to the disclosed examples without departing from the scope of the present disclosure. These and other changes or modifications are intended to be included within the scope of the present disclosure, as expressed in the following claims.

What is claimed is:

1. A method comprising:

tracking, using one or more first machine learning models, feet of a user in a first video stream captured by a first camera coupled to a display screen, the one or more first machine learning models trained by comparing tracking information for training images with estimated tracking information generated by the one or more first machine learning models based on the training images;

presenting, on the display screen, the first video stream including the feet of the user captured by the first camera on a first portion of the display screen and a second video stream including a body of the user captured by a second camera coupled to the display screen, the second video stream presented on a second portion of the display screen;

estimating, using one or more second machine learning models, an estimated shoe size of the user based on images extracted from the first video stream;

presenting, on the second video stream, an augmented reality (AR) shoe depicted over the feet in the second video stream, wherein the AR shoe in the second video stream is sized based on the estimated shoe size of the user; and changing between different AR shoes that are depicted over the feet in the first video stream and the second video stream in response to gestures performed by the feet of the user, the gestures detected based on the estimated tracking information generated by the one or more first machine learning models based on the first video stream.

2. The method of claim 1, wherein the first camera is placed at a first specified distance from a floor level, and wherein at least a portion of the display screen is placed at a second specified distance from the floor level, the second specified distance being greater than the first specified distance.

3. The method of claim 1, further comprising:

detecting a foot gesture performed by the feet in the first video stream; and triggering activation of the display screen to present the first video stream in response to detecting the foot gesture.

4. The method of claim 1, further comprising:

detecting a fashion item being worn by the feet of the user in the first video stream; and extracting, from the first video stream, a portion comprising the fashion item.

5. The method of claim 1, further comprising:

receiving input that activates an AR experience associated with trying on shoes; and in response to the input, adding the AR shoe to the feet in the first video stream captured by the first camera.

6. The method of claim 5, further comprising:

modifying the first video stream presented to the user on the display screen to depict the AR shoe that has been added to the feet.

7. The method of claim 5, further comprising:

receiving a selection of the AR shoe from a list of AR shoes presented on the display screen.

8. The method of claim 7, wherein the AR shoe is a first AR shoe, further comprising:

detecting a gesture associated with the feet depicted in the first video stream; and selecting a second AR shoe from the list of AR shoes in response to detecting the gesture.

9. The method of claim 8, further comprising:

adding the second AR shoe instead of the first AR shoe to the feet.

10. The method of claim 8, wherein the gesture comprises touch input of a portion of the display screen.

11. The method of claim 8, wherein the gesture comprises a foot gesture performed by the feet depicted in the first video stream.

12. The method of claim 8, wherein the second AR shoe corresponds to a different style or color of the first AR shoe.

13. The method of claim 1, wherein the first camera is coupled to the display screen via one or more external wires.

14. The method of claim 1, wherein the display screen comprises a full-body display screen that is placed on a floor of a real-world environment, and wherein the first camera is integrated with the display screen at a bottom of the display screen.

15. The method of claim 1, wherein the one or more second machine learning models are trained based on training data comprising images of feet and images of shoes with corresponding shoe sizes.

16. The method of claim 15, further comprising:

overlaying the AR shoe on the feet in the first video stream to present the first video stream including the feet of the user and the AR shoe on the display screen.

17. A system comprising:

at least one processor of a device configured to perform operations comprising:

tracking, using one or more first machine learning models, feet of a user in a first video stream captured by a first camera coupled to a display screen, the one or more first machine learning models trained by comparing tracking information for training images with estimated tracking information generated by the one or more first machine learning models based on the training images:

presenting, on the display screen, the first video stream including the feet of the user captured by the first camera on a first portion of the display screen and a second video stream including a body of the user captured by a second camera coupled to the display screen, the second video stream presented on a second portion of the display screen;

estimating, using one or more second machine learning models, an estimated shoe size of the user based on images extracted from the first video stream;

presenting, on the second video stream, an augmented reality (AR) shoe depicted over the feet in the second video stream, wherein the AR shoe in the second video stream is sized based on the estimated shoe size of the user; and changing between different AR shoes that are depicted over the feet in the first video stream and the second video stream in response to gestures performed by the feet of the user, the gestures detected based on the estimated tracking information generated by the one or more first machine learning models based on the first video stream.

18. The system of claim 17, wherein the gestures comprise tapping heels of the feet together.

19. The system of claim 17, the operations comprising:

detecting a foot gesture comprising tapping heels of the feet together performed by the feet in the first video stream; and triggering activation of the display screen to present the first video stream in response to detecting the foot gesture comprising tapping heels of the feet together.

20. A non-transitory machine-readable storage medium that includes instructions that, when executed by one or more processors of a device, cause the device to perform operations comprising:

tracking, using one or more first machine learning models, feet of a user in a first video stream captured by a first camera coupled to a display screen, the one or more first machine learning models trained by comparing tracking information for training images with estimated tracking information generated by the one or more first machine learning models based on the training images;

presenting, on the display screen, the first video stream including the feet of the user captured by the first camera on a first portion of the display screen and a second video stream including a body of the user captured by a second camera coupled to the display screen, the second video stream presented on a second portion of the display screen;

estimating, using one or more second machine learning models, an estimated shoe size of the user based on images extracted from the first video stream;

presenting, on the second video stream, an augmented reality (AR) shoe depicted over the feet in the second video stream, wherein the AR shoe in the second video stream is sized based on the estimated shoe size of the user; and changing between different AR shoes that are depicted over the feet in the first video stream and the second video stream in response to gestures performed by the feet of the user, the gestures detected based on the estimated tracking information generated by the one or more first machine learning models based on the first video stream.

* * * * *